United States Patent Office 3,261,766
Patented July 19, 1966

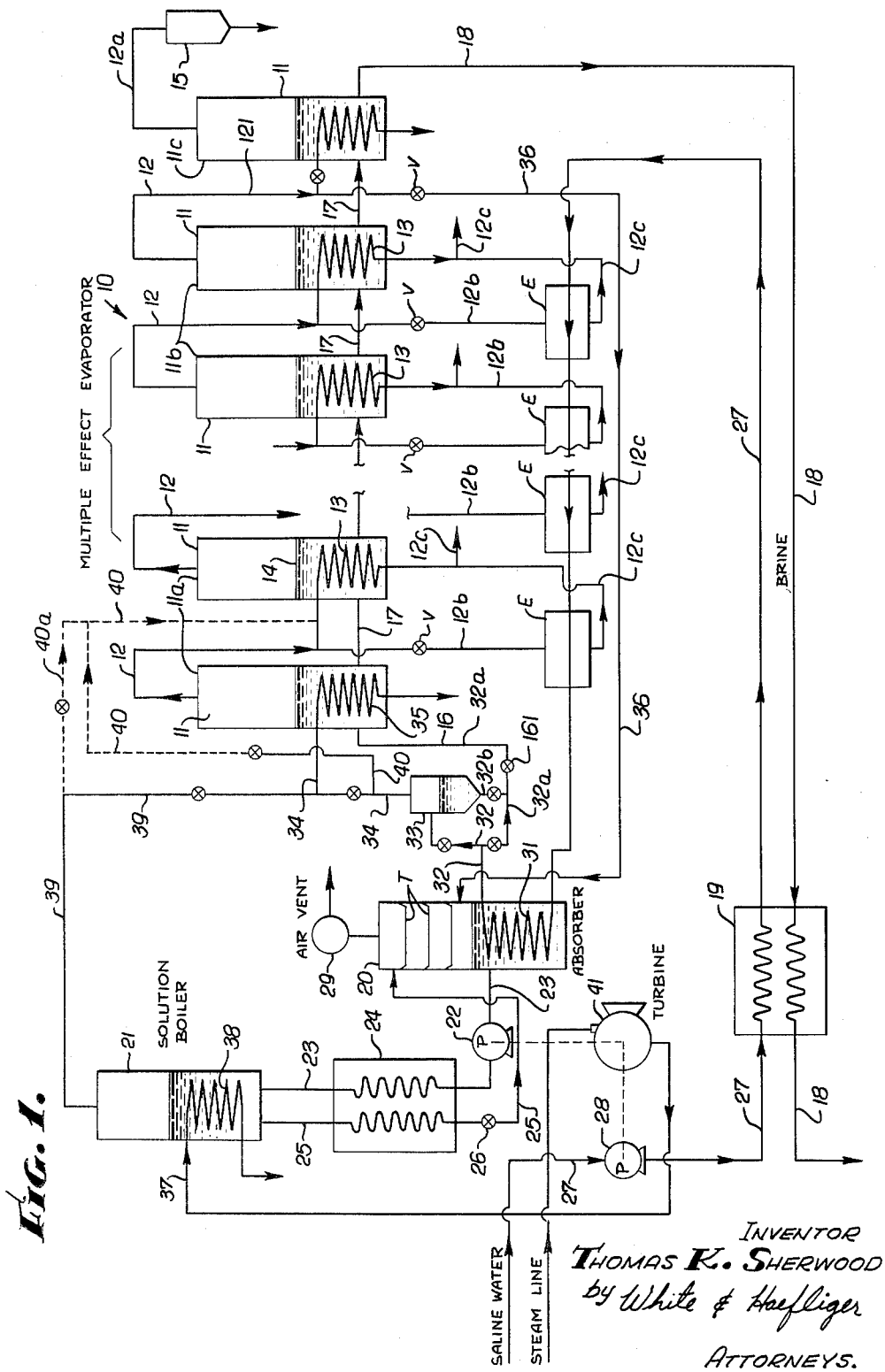

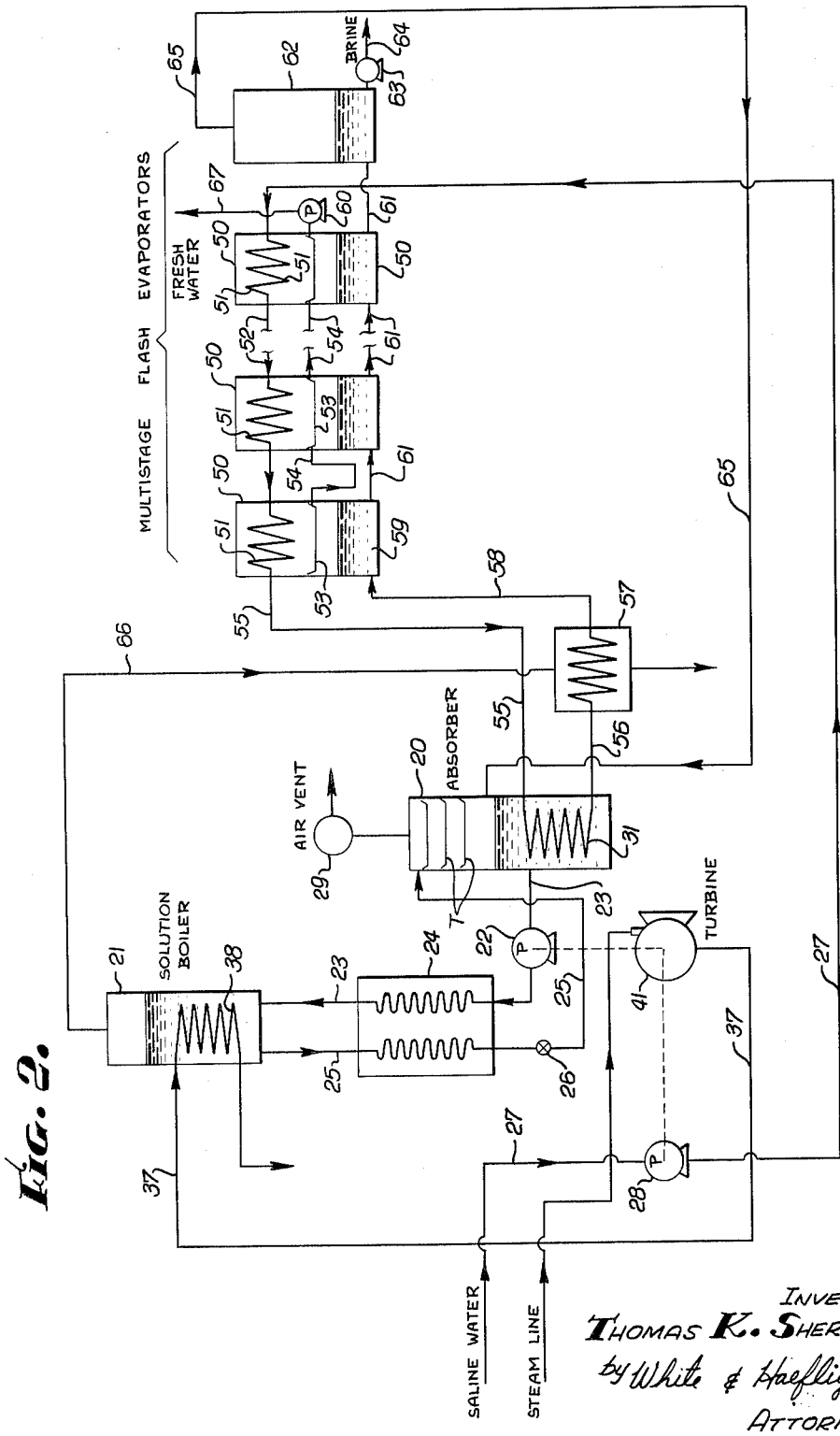

3,261,766
MULTISTAGE EVAPORATION WITH ABSORPTION
OF DISTILLED VAPORS
Thomas K. Sherwood, Concord, Mass., assignor to The
Fluor Corporation, Ltd., Los Angeles, Calif., a corporation of California
Filed Dec. 11, 1964, Ser. No. 417,551
12 Claims. (Cl. 203—11)

This application is a continuation-in-part of my application serial number 204,931, filed June 25, 1962 on "Evaporation of Saline Waters."

This invention has to do with improved methods for the evaporation of saline waters, importantly sea water, by use of multi-stage evaporators which may be of the well known multiple effect or multi-stage flash types of evaporators in which the saline water is passed through successively reducing pressure zones from which vapor is condensed by indirect heat exchange with the saline water passing through the same or a successive zone.

The invention has for its general object to provide for increased water vapor heating of saline water subject to vaporization in the initial or early evaporative stages, by a system deriving heat economically from available steam, and involving also transference of heat to the water through the medium of vapor recirculated from a later low pressure evaporative stage or effect. This objective is obtained while at the same time limiting boiling temperatures of the saline water to a maximum in the range of 200–250° F., above which serious scale deposits may be formed on heating surfaces when using various saline waters, including sea water.

More particularly, the invention contemplates employment of a practical and economical system for effecting recirculation and heating of water vapor to supplement that resulting from preheating of the saline water feed, by an absorption system which avoids any necessity for mechanical compression of the initially low pressure recirculated vapor, to the multiple effect evaporator inlet pressure, and which lends itself simply and economically to transference of heat from a steam source to the recirculated vapor, and to preheating of the feed water by the absorption medium.

While capable of using to advantage heat input steam that may be available in wide-high pressure ranges, and having a condensing temperature well above the maximum imposed by scale-forming tendencies of many saline waters, the present system presents an opportunity for utilization of exhaust steam from motors or turbines that generate power, where such exhaust steam is sufficiently high in pressure, e.g. in the range of 100 to 150 p.s.i.g. (pressure as pounds per square inch gage) to have a temperature potential sufficiently high for vaporization of the recirculated vapor from its absorbent solution at the pressure this recirculated vapor is returned to the evaporator system.

By utilization of the present system with proper selection and control of temperatures and pressures in relation to fluid quantities, it appears possible, if desired, to roughly nearly double the quantity of water vapor going to the first evaporation stage at a temperature (e.g. 200° F. to 250° F.) permitting of low scale formation, as compared with conventional systems deriving first stage vapors merely by the use of fresh steam.

All the features and objects of the invention, as well as the details of an illustrative embodiment, will be more fully and readily understood from the following description of the accompanying drawings in flow sheet form, and in which:

FIG. 1 illustrates the invention employing a multiple effect evaporator; and

FIG. 2 is a similar showing of another embodiment of the invention employing multistage flash evaporators.

Referring first to FIG. 1, I have indicated diagrammatically at 10 a multiple effect evaporator system of conventional type employing a series of vaporization chambers or zones 11, the number of which may be greater or less than shown. As will be understood, the system illustrated is intended to merely typify usable sequential type evaporative processes, and will be recognized as what commonly is termed a multi-stage evaporation system. In reference to claim terminology, "early stage" means a zone 11a at or toward the beginning of the series, and "later stage" means a zone 11b toward the end of the series. As in the conventional system, vapor produced in each of the zones passes through a line 12 for indirect heat exchange as in coil 13, with the saline water 14 in the next successive stage, producing partial vaporization of the water therein. Vapor line 12a of the final stage 11c connects with a vacuum pump or ejector 15 so that the evaporation zones are maintained under successively reducing pressures and the pressure in line 121 going to the final chamber 11c, may be in the order of about 82 mm. mercury absolute. Preheated saline water fed to the initial stage through line 16, passes serially through the chambers and interconnecting lines 17 to be progressively concentrated in accordance with the vaporization occurring in each chamber. The finally concentrated brine is discharged from the system through line 18 and exchanger 19.

As previously indicated, the process employs a recirculated vapor absorption and regeneration system diagrammatically illustrated by absorber 20, having an appropriate air vent 29, and a regenerator or boiler 21. Liquid hygroscopic absorbent is continuously discharged from the absorber 20 by pump 22 through line 23 and exchanger 24 to the boiler 21, and returned to the absorber through line 25 and the exchanger, with the solution flow properly throttled by valve 26.

It is contemplated that the absorbent may be any hygroscopic liquid or solution capable of absorbing the water vapor recirculated as later described. Merely as illustrative, aqueous solutions of sodium hydroxide, lithium bromide, phosphoric acid or the commercially known "Dow 17A," may be cited as usable absorbents. Of these, aqueous sodium hydroxide may be regarded as illustrative. Thus the absorbent solution in the boiler 21 may consist of about 160 weight parts of sodium hydroxide in 100 parts of water.

Saline water fed to the system through line 27 is discharged by pump 28 through an appropriate heat exchange system that will adequately raise the temperature of the water as required for heat exchange in the absorber 20. As illustrative, the feed may be passed through exchanger 19 to receive heat from the line 18 brine, and thence passed through a series of exchanger-condensers E which may receive through lines 12b a portion of the overhead vapors from lines 12 under control of valves V, condensate from the exchangers E being passed through lines 12c to be recovered as water distillate along with the condensate from coils 13. The preheated feed saline water passes through coil 31 and thence either through line 32 to the separator 33, or directly through line 32a into the first of the evaporator zones 11a.

From the separator 33 (where vapor-liquid separation is desired) the water passes through line 32b, 32a and reducing valve 161 into and through the evaporator chambers 11. Vapors from the separator pass through line 34 to condense in coil 35 and heat the water in the first evaporator stage 11, or they may be taken wholly or in part through line 40 to a later effect.

A portion of the vapors generated in a later evaporator stage, for example the vapor passing through line 121 to the final stage 11c, is recirculated through line 36 to the bottom of the absorber 20, wherein any suitable means, such as trays T, may be provided to promote that intimacy of contact with the absorbent solution as will effect absorption therein of the recirculated vapor. The heat evolved when the recirculated vapor condenses in the absorbent is transferred to the saline water passing through coil 31, and the quantity of recirculated vapor may be so governed as to produce that heat of solution which will vaporize approximately one pound of near-atmospheric steam from the saline water fed, providing it is suitably preheated. This steam is formed partly in coil 31 and partly by flashing as the pressure is reduced in valve 161. The second portion passes to the second effect. The solution with its absorbed water is continuously discharged by pump 22 to the boiler 21, wherein the diluted solution is heated to vaporize the absorbed water by steam circulated from line 37 through coil 38. The evolved steam, which corresponds in quantity to the water vapor absorbed in the absorber, passes from the boiler through line 39 to be combined with the steam in line 34, all or a portion of the boiler overhead may be introduced through line 40a, 40 to a subsequent early stage or zone 11.

The steam supplied through line 37 to the boiler may be derived from any suitable source which provides steam at adequately high pressure, say 100 p.s.i.g., and which will provide a temperature level sufficient for stripping of the absorbent in the boiler. As previously mentioned, the invention affords an opportunity for advantageously using adequately high pressure exhaust steam from equipment that may operate as pumping or other power sources in the plant, including steam at condensing temperatures higher than normally allowable in evaporation systems for scale-forming saline waters. Thus, for example, the feed water pump 28, and also if desired pump 22, may be driven by a steam motor such as turbine 41, the exhaust from which is taken through line 37 to provide the solution boiling heat.

To cite illustrative operating conditions, the vapor may be recirculated through line 36 at a pressure of about 82 mm. absolute and 118° F. temperature and condensed in the absorber solution having a temperature of about 223° F. The high pressure steam introduced to the boiler 21 may be at about 115 p.s.i.g. and 347° F., resulting in a boiler solution temperature at 760 mm. of about 337° F. The highly superheated steam leaving the boiler condenses in the evaporator coil 35 (or 13) at about 212° F. The properties of solutions of sodium hydroxide in water are such that these operating conditions are maintained when boiling a strong solution containing 61.5 weight percent sodium hydroxide in boiler 21, while maintaining a 54.5 weight percent sodium hydroxide solution in the absorber 20 to absorb low-pressure recycled vapor.

Depending on the particular absorbing solution employed, the degree of cooling of absorber feed solution in 25, and the degree of preheat effected in the exchanger 19, more or less vapor will be formed from the liquid feed passing through 31, but with the operating conditions described, this vapor may amount to more than one-half pound per pound of low pressure vapor recirculated. To obtain this result it is desirable to further preheat the saline water feed leaving the exchanger 19 by the use of several exchangers in series, each heated by a small amount of steam bled from successive stages of the evaporative system. This provision for further feed preheat, shown on the diagram, is common in the art of multiple-effect evaporation.

FIG. 2 illustrates another embodiment of the invention similar to the described system except in the employment of multistage flash evaporators which operate to achieve essentially the same overall evaporative and heat interchange results as the multiple effect evaporator of FIG. 1, the principal difference being that in multistage flash evaporators the feed saline water condenses vapors in the same zones within which they are generated, as distinguished from generation in one zone and condensation in a successive zone as described with reference to FIG. 1. However, in both systems vapor is generated in each evaporator zone or stage and the vapor is condensed by indirect heat exchange with the saline water passing through the zones.

In FIG. 2, components of the system inclusive of the absorber, solution boiler and interconnecting lines and auxiliary equipment, correspond to similar components in the FIG. 1 system and are given the same reference numerals. The multistage flash evaporator system is shown to comprise a succession of chambers or stages 50 of any suitable number, each containing a condenser coil 51 or the equivalent, in a common flow line 52, and containing below each coil a condensate collection tray 53, or the equivalent, interconnected by a common flow line 54. The saline feed water pumped through line 27 enters coil 51 of the final stage and then flows by way of line 52 through the successive coils 51 to finally pass through line 55 to the absorber coil 31. After indirect heat exchange with the hygroscopic absorbent, the preheated water passes through line 56, exchanger 57 and line 58 of the first evaporator stage 50 wherein the liquid body 59 undergoes partial evaporation and the vapors are condensed by coil 51 for recovery as fresh water through line 54, the total recovery being discharged by pump 60 through line 67.

After undergoing progressive vaporizations in the successive stages 50 and flow through the brine transfer lines 61, the concentrated brine enters separator 62 from which the brine is taken by pump 63 in line 64, and the separated steam is returned through line 65 to the absorber 20 in the manner of the FIG. 1 steam return from the final evaporative stage through line 36.

As illustrative operating conditions, in the FIG. 2 system the brine may be delivered through line 27 to the evaporators at a temperature of about 70° F. and become preheated in passage through coils 51 to a temperature of 210° F. at which the water enters the absorber coil 31. Therein the water is heated to about 216° F. and elevated in passing through exchanger 57 to a temperature of about 220° F. at which the water enters the first evaporative stage. The line 23 absorbent enters the boiler 21 at a temperature of about 298° F. and is heated to about 337° F. in the boiler to be returned to the absorber at a temperature beyond exchanger 24 of about 277° F. The boiler heating steam is at about 165 p.s.i.g. and 366° F. Steam leaving the boiler passes through line 66 at about 337° F. for indirect heat exchange with the water passing through 57. The recycle steam passes to the recirculation line 65 at about 215 mm. pressure.

It will be understood that the equipment diagrammatically illustrated in the flow sheet, in actual practice may be constructed and operated according to design and engineering practices known to those skilled in the art, and with many recognizable variations known to be usable for efficiently accomplishing the described effects and results.

I claim:

1. In the evaporation of saline water by passage through a series of evaporator zones in each of which vapor is generated and the vapor is condensed by indirect heat exchange with the saline water passing through the zones, the method that includes:
   (A) continuously circulating a hygroscopic absorption liquid through an absorption zone and a boiling zone,
   (B) passing water vapor at low subatmospheric pressure from one of said evaporator zones among the later stages into said absorption zone and therein absorbing the vapor in said liquid,
   (C) pumping the resulting liquid into said boiling zone to effect said circulation and heating the liquid therein by indirect heat exchange with steam to vaporize the absorbed water, (D) passing a saline water stream in indirect heat exchange with the absorption zone liquid and thence through said evaporator zones; and (E) passing water vapor from said boiling zone into one of said evaporator zones among the early stages thereof to condense the vapor therein.

2. The method according to claim 1, in which the liquid temperature in said first evaporator zone is between about 200° F. and 250° F.

3. The method according to claim 1, in which said steam used to heat the liquid in the boiling zone is motor exhaust steam.

4. The method of claim 3, in which the pressure of said steam is between about 100 to 150 p.s.i.g.

5. The method according to claim 1, in which vapor from said boiling zone is passed in indirect heat exchange with the water from said absorption zone to increase its vaporization in one of said evaporator zones among the early stages in said series.

6. The method according to claim 1, in which vapor is formed by heat transfer to the saline water in the absorption zone and said vapor is separated and passed into one of said evaporator zones among the early stages in said series for indirect heat transfer to the liquid therein.

7. The method according to claim 6, in which vapor from said boiling zone is passed in indirect heat transfer with water from said absorption zone.

8. The method of claim 1, in which said absorption zone is maintained under low subatmospheric pressure and the absorption liquid is throttled in its flow from the boiling zone to the absorption zone.

9. The method of claim 1, in which said absorption liquid is aqueous sodium hydroxide.

10. The method of claim 1, in which approximately the following conditions exist:

the absorption liquid temperature in the absorption zone is about 223° F. and in the boiling zone about 337° F.

the pressure of the water vapor passed to the absorption zone (step B) is about 82 mm. absolute, and the heated saline water enters the first of said evaporative stage zones at a temperature of about 200° F. and at near atmospheric pressure.

11. The method of claim 10, in which steam at about 115 p.s.i.g. is used to heat the liquid in said boiling zone.

12. The method according to claim 1 in which the total amount of low pressure steam fed to the distillation system is substantially greater than the quantity of steam fed to the solution boiler.

References Cited by the Examiner

UNITED STATES PATENTS

| 2,759,882 | 4/1956 | Worthen | 203—24 |
| 3,000,794 | 9/1961 | Tschopp | 203—77 X |
| 3,021,265 | 2/1962 | Sadtler | 203—11 |

NORMAN YUDKOFF, *Primary Examiner.*

J. B. DONIHEE, *Assistant Examiner.*